Figure 1:
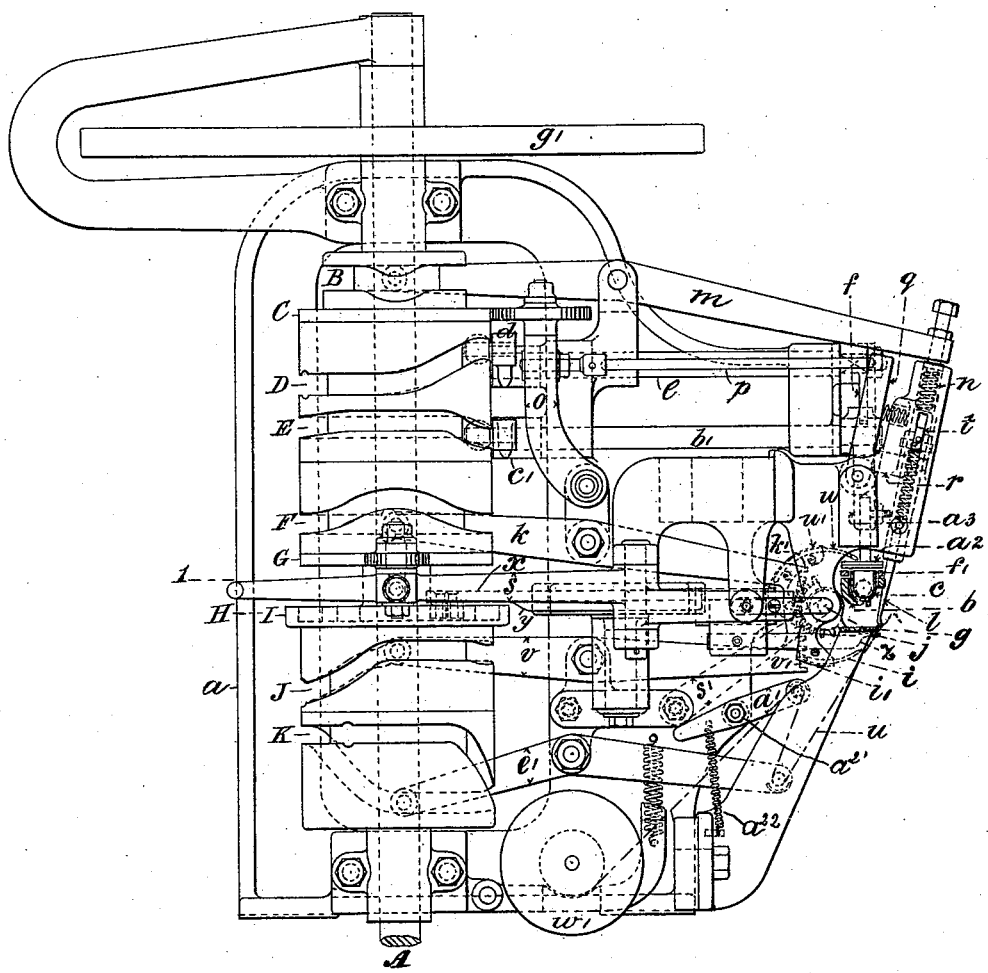

(No Model.) 12 Sheets—Sheet 1.

J. W. RAMSDEN & H. S. ELLIS.
SEWING MACHINE.

No. 469,217. Patented Feb. 16, 1892.

Witnesses.
Thos. E. Craven. Fel. Inst. P.A.
William Sadler

Inventors
John William Ramsden
Harry Senior Ellis.

(No Model.) 12 Sheets—Sheet 2.
J. W. RAMSDEN & H. S. ELLIS.
SEWING MACHINE.

No. 469,217. Patented Feb. 16, 1892.

(No Model.) 12 Sheets—Sheet 3.

J. W. RAMSDEN & H. S. ELLIS.
SEWING MACHINE.

No. 469,217. Patented Feb. 16, 1892.

Witnesses.
Thos. E. Craven. Fel. Inst. P.A.
William Sadler

Inventors.
John William Ramsden
Harry Senior Ellis (No Model.) 12 Sheets—Sheet 4.
J. W. RAMSDEN & H. S. ELLIS.
SEWING MACHINE.
No. 469,217. Patented Feb. 16, 1892.
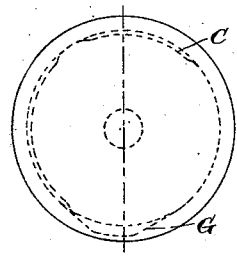
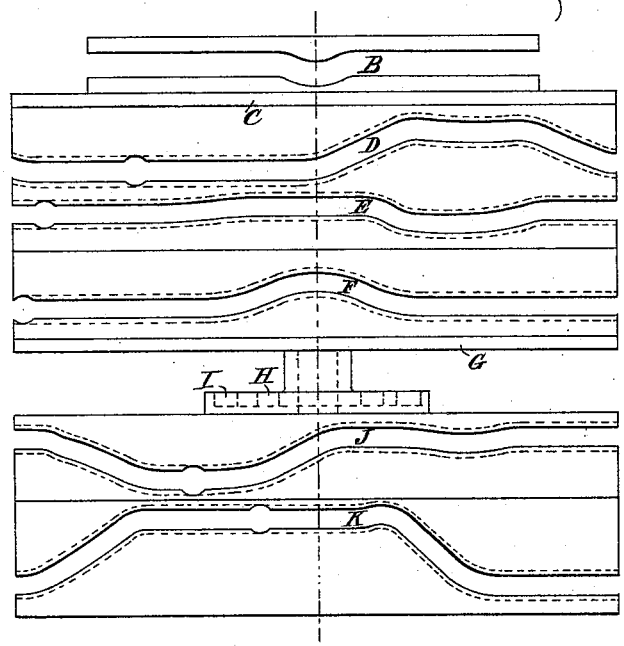
Fig. 5.
Witnesses.
Thos. E. Craven. Fel. Inst. P.A.
William Sadler.
Inventors.
John William Ramsden
Harry Senior Ellis.

(No Model.) 12 Sheets—Sheet 5.

J. W. RAMSDEN & H. S. ELLIS.
SEWING MACHINE.

No. 469,217. Patented Feb. 16, 1892.

(No Model.) 12 Sheets—Sheet 6.

J. W. RAMSDEN & H. S. ELLIS.
SEWING MACHINE.

No. 469,217. Patented Feb. 16, 1892.

Witnesses.
Thos. E. Craven. Fel. Inst. P.A.
William Sadler.

Inventors.
John William Ramsden
Harry Senior Ellis.

(No Model.) 12 Sheets—Sheet 7.

J. W. RAMSDEN & H. S. ELLIS
SEWING MACHINE.

No. 469,217. Patented Feb. 16, 1892.

Witnesses
Thos. E. Craven. Fel. Inst. P.A.

William Sadler.

Inventors
John William Ramsden
Harry Senior Ellis (No Model.) 12 Sheets—Sheet 8.

J. W. RAMSDEN & H. S. ELLIS.
SEWING MACHINE.

No. 469,217. Patented Feb. 16, 1892.

Witnesses.
Thos. E. Craven. Fel. Inst. P.A.
William Sadler.

Inventors
John William Ramsden
Harry Senior Ellis.

(No Model.) 12 Sheets—Sheet 9.

J. W. RAMSDEN & H. S. ELLIS.
SEWING MACHINE.

No. 469,217. Patented Feb. 16, 1892.

Witnesses.
Thos. E. Craven. Fel. Inst. P.A.
William Sadler.

Inventors.
John William Ramsden
Harry Senior Ellis.

(No Model.) 12 Sheets—Sheet 10.
J. W. RAMSDEN & H. S. ELLIS.
SEWING MACHINE.
No. 469,217. Patented Feb. 16, 1892.
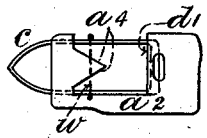
FIG. 17.
FIG. 18.
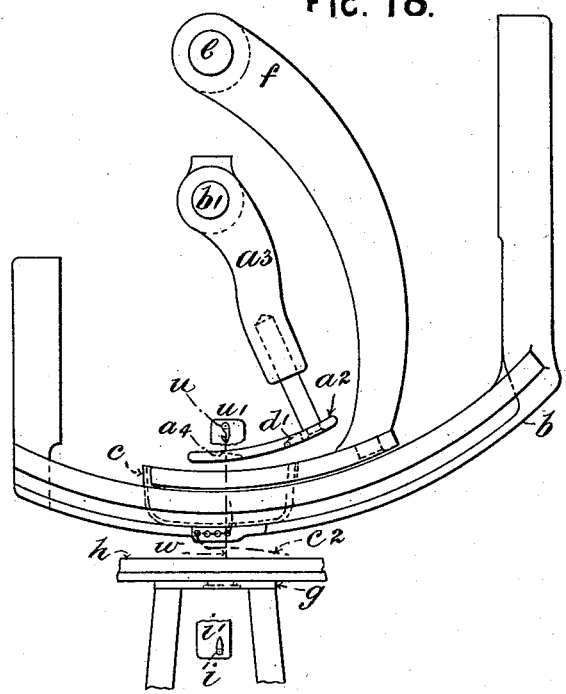
FIG. 19.
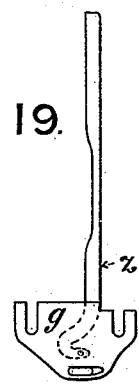
Witnesses.
Thos. E. Craven. Fel. Inst. P.A.
William Sadler.
Inventors.
John William Ramsden
Harry Senior Ellis.

(No Model.) 12 Sheets—Sheet 11.
J. W. RAMSDEN & H. S. ELLIS.
SEWING MACHINE.

No. 469,217. Patented Feb. 16, 1892.

Witnesses
Thos. E. Craven, Fel. Inst. P.A.
William Sadler.

Inventors.
John William Ramsden
Harry Senior Ellis.

(No Model.) 12 Sheets—Sheet 12.
J. W. RAMSDEN & H. S. ELLIS.
SEWING MACHINE.
No. 469,217. Patented Feb. 16, 1892.
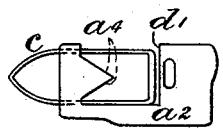
Fig. 21.
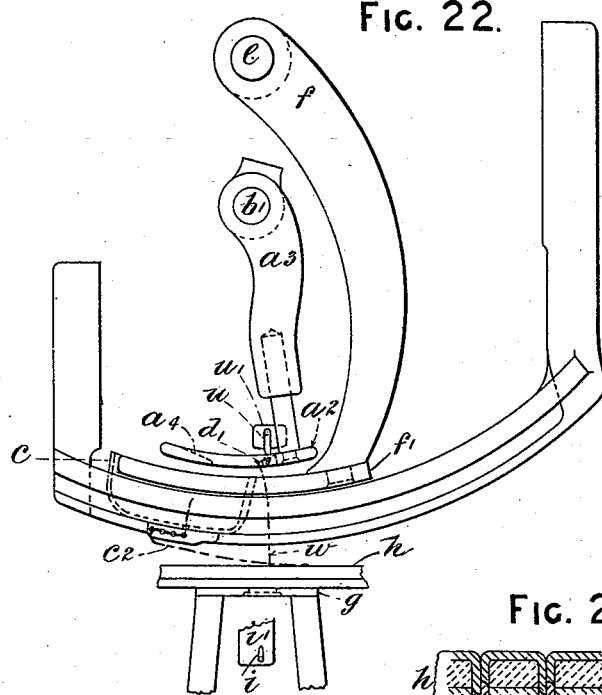
Fig. 22.
Fig. 24.
Fig. 23.
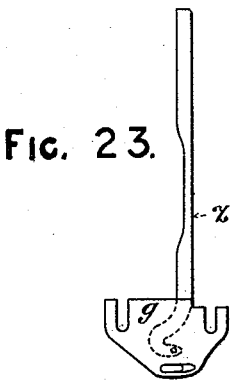
Witnesses.
Thos. E. Craven. Fel. Inst. P.A.
William Sadler.
Inventors.
John William Ramsden
Harry Senior Ellis

UNITED STATES PATENT OFFICE.

JOHN WILLIAM RAMSDEN AND HARRY SENIOR ELLIS, OF LEEDS, ENGLAND, ASSIGNORS, BY MESNE ASSIGNMENTS, TO GORDON McKAY, OF NEWPORT, RHODE ISLAND, AND JAMES W. BROOKS AND A. VAN WAGENEN, OF BOSTON, MASSACHUSETTS.

SEWING-MACHINE.

SPECIFICATION forming part of Letters Patent No. 469,217, dated February 16, 1892.

Application filed February 20, 1890. Serial No. 341,157. (No model.)

*To all whom it may concern:*

Be it known that we, JOHN WILLIAM RAMSDEN and HARRY SENIOR ELLIS, engineers, subjects of the Queen of Great Britain and Ireland, residing at Leeds, in the county of York, Kingdom of Great Britain and Ireland, have invented new and useful Improvements in Sewing-Machines, of which the following is a specification.

In the specification of Letters Patent No. 348,474, granted to us August 31, 1886, we have described certain improvements in lock-stitch sewing-machines using two wax threads and adapted for closing the uppers of boots and shoes and for other work.

This present invention has for its aim to adapt sewing-mechanism of this general class to the purpose of stitching soles to welted boots and shoes when on the last.

In this our invention we employ a reciprocating shuttle working in a curvilinear shuttle-race located within the path of movement of a circularly-moving needle and piercer or awl, the said race being at right angles to the plane of movement of the needle and piercer, the said needle and shuttle-race being located above the work-support, so that the operator can readily see the stitch being formed. The curved needle is arranged above the work and the curved piercer beneath the work, their axes of motion being substantially the same as in usual sole-stitching machines. Herein, as in other machines, the work is fed by the piercer, while in the material the piercer at such time having given to it a sidewise movement by a cam on the main shaft of the machine and lever, as will be described. The machine also contains a stitching cap or rest, against which the boot or work is held by the operator. The looper employed to supply the looper-thread to the hook of the needle has a curvilinear or compound movement imparted thereto by cams of suitable form on the main shaft of the machine. In operation the circularly-moving piercer first makes a perforation in the work under treatment and then by a sidewise movement feeds such work to bring the perforation made therein in or coincident with the path of movement of the circularly-moving hooked needle. The piercer then retires from the stock and is returned to its normal position to again at the proper time pierce the work. During the retirement of the piercer from the stock the needle advances and passes through the hole made by the piercer, and rising through the work receives upon its hook the looper-thread, when the needle retires and draws the looper-thread through the work and above the shuttle-race, and then a dividing or stripping plate open on one side for the curved needle to pass through it now advances and opens the loop. The shuttle next enters and passes through the loop, leaving therein the shuttle-thread. The dividing or stripping plate then moves in the opposite direction, presenting its stripping-bar in position to take the loop from the hook of the needle, the latter dipping or slightly advancing for that purpose. The loop having been taken from the hook of the needle the stitch so formed is tightened, as will be described, by the take-up. The shuttle employed has an open face, and at its back has a thread-delivery eye, the thread leading from the back of the shuttle down to the work upon the work plate or support below it. This shuttle has a suitable tension device.

Figure 2:
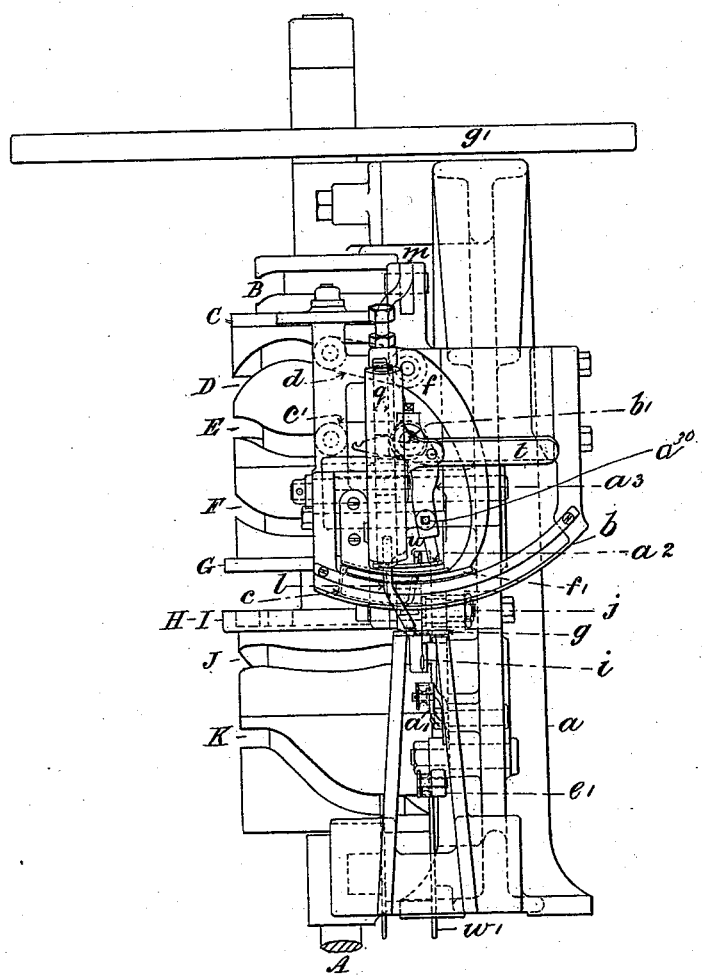
Figure 3:
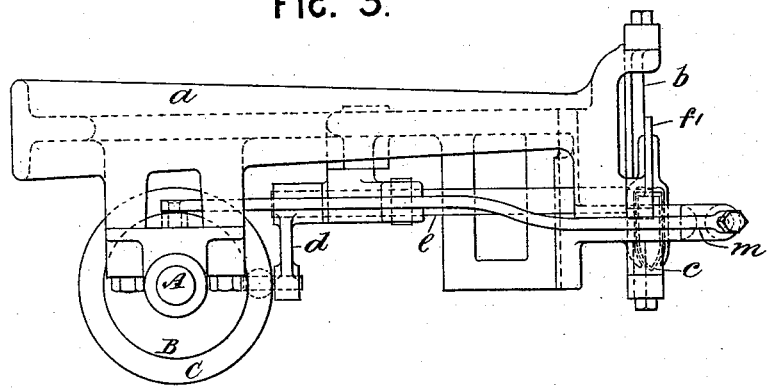
Figure 4:
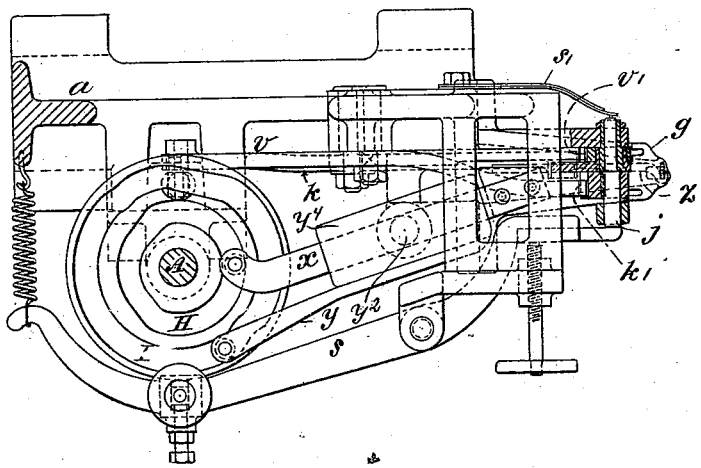
Figure 6:
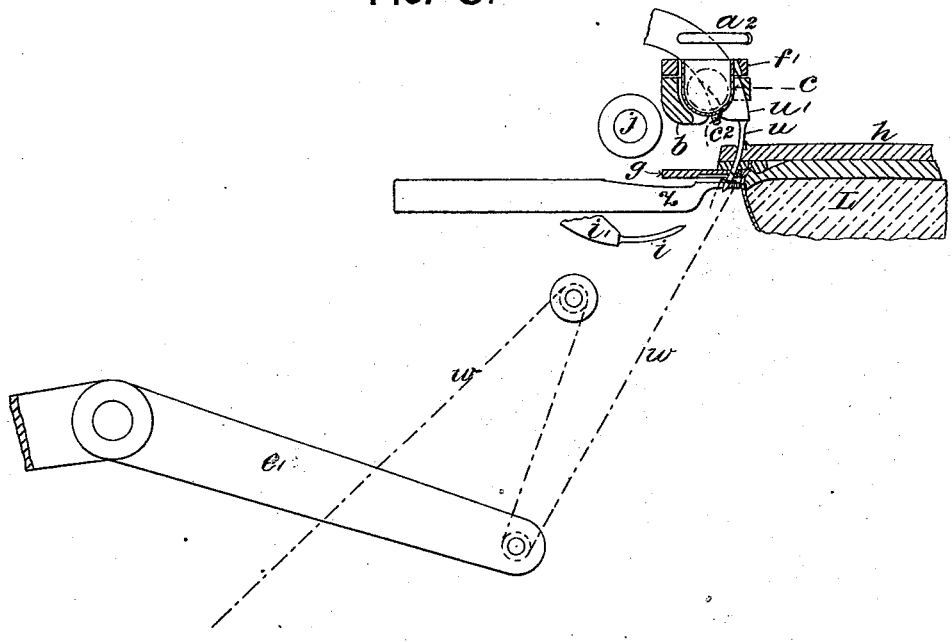
Figure 7:
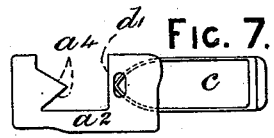
Figure 8:
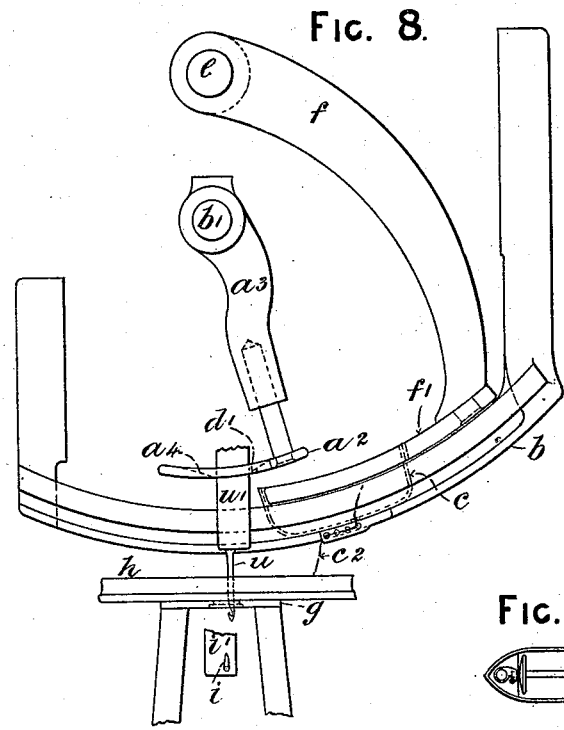

Referring to the annexed drawings, in which similar letters and numerals refer to like parts in all the views, Figure 1, Sheet 1, is a side elevation of a sewing-machine embodying our invention; Fig. 2, Sheet 2, a front elevation. Fig. 3 is a top or plan view of the main part of the machine shown in Fig. 2; and Fig. 4 is a section below the dotted line 1 1, Fig. 1. Figs. 5 to 24, both inclusive, illustrate to an enlarged scale various details of the machine and also the positions occupied by sundry parts during the cycle of operations, and hereinafter referred to.

*a* is the standard or head-stock of the machine; *b*, the curvilinear shuttle-race placed in a vertical plane above the work to be done; *c*, the shuttle actuated by the cam D, lever *d*, shaft *e*, and arm *f*, and the shuttle-driver *f'* attached thereto; *g*, the stitching-cap or work-support upon which the welt of a boot $h$ is caused to bear (more particularly shown in Fig. 6, Sheet 5) while the sole $h^{10}$ is being sewed thereto. $i$ is the circular piercer which enters at the welt. This is mounted on the axis $j$ and caused to make its angular movement by the cam F, lever $k$, with its toothed sector $k'$, taking into corresponding teeth in its holder $i'$. $l$ is the pressure-foot acting on the sole and exerts its force by means of the cam B, lever $m$, and spring $n$, and is locked in position by the cam C, lever $o$, rod $p$, lever $q$, and piston $r$ while the piercing takes place, but is released during the feed of the boot, which is effected by a sidewise movement of the piercer by means of the cam G and lever $s$, acting on the end of of the axis $j$, to which the carrier of the piercer is attached. Its backward movement is effected by the spring $s'$. The lever $t$ is for raising the foot by hand to admit of the placing of the boot upon the stitching-cap or removing it therefrom. Immediately after the piercing and the feeding have taken place and while the piercer is retiring the curved hooked needle $u$, mounted upon the same axis as the piercer, is caused to advance through the perforation by means of the cam J, lever $v$, with its toothed sector $v'$, taking into corresponding teeth in its carrier or holder $u'$. On the needle having passed through the sole and the welt the looper-thread $w$ from the reel $w'$ is placed in the hook thereof by means of the lever $z$, it having a compound sliding and oscillating movement derived from the cams H and I, (see Fig. 4,) acting, respectively, upon the slide $x$ and lever $y$, causing the thread-delivery end of the looper to pass partly around the hooked end of the needle and to place the thread into the said hook. The lever $y$, pivoted at $y^2$, (see Fig. 4,) has as part of it a sort of box or guide $y^4$, in which is reciprocated the shank $x$, which at its forward end carries the looper Z.

$e'$ is a take-up lever having a suitable roller or other stud, over the end of which and also over a roller or other stud $a^{20}$ on a lever $a'$, pivoted at $a^{21}$ and acted upon by a spring $a^{22}$, passes the looper-thread on its way from the reel $w'$ to the looper Z, the lever $a'$ serving to take up any slack in the looper-thread while the latter is being placed in the hook of the needle. The needle in its backward stroke draws the looper-thread through the welt and the sole to a suitable distance above the shuttle-race and within a dividing and stripping plate $a^2$, carried by the arm $a^3$, mounted upon an axis $b'$ and having a reciprocating motion imparted to it by the cam E and lever $c'$. The loop having been drawn up, as stated, the stripping-plate is now caused to advance and divide the two sides of the loop, upon which the shuttle $c$ passes through it and leaves its thread supplied by the spool $c^2$ in the said loop, after which the dividing and stripping plate is moved in the opposite direction to place its stripping-bar $d'$ (see Fig. 22) in such position that upon the needle being moved slightly in the direction to give up the loop held by it the said stripping-bar will effect the discharge of the loop of needle-thread from the hook of the needle, and thereafter the lever $e'$, acted upon by the cam K, draws up the slack in the looper-thread, linking the said thread with the shuttle-thread and forming what is known as a "lock-stitch," as represented in Fig. 24. These movements complete the cycle of operations, after which and previous to the next piercing and feeding of the material the various parts of the mechanism have resumed their normal positions for continuing the above-described operations.

A is the main shaft of the machine, upon which the various cams are mounted.

$g'$ is a fly-wheel or regulator thereon and used as a means for bringing by hand the machine to the starting-point.

Fig. 5, Sheet 4, is a development of the actuating-cams B C D E F G H I J K on the main shaft A of the machine, which receives motion from any convenient motor.

Figs. 6 to 9 show the commencement of the formation of the lock-stitch as effected by our machine. L is a last upon which a boot or shoe $h$ under treatment is placed. The piercer $i$ is assumed to have pierced the work or material and to have taken its sidewise movement and placed the perforation made by the piercer in position to coincide with the path of the needle and have been withdrawn into its backward position. The curved hooked needle $u$ is here shown through the material $h$, and while in this position the looper-thread $w$ is placed in the hook thereof by the looper Z, actuated by the two cams H and I, as previously referred to.

Figure 10:
Figure 11:
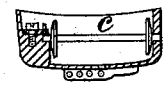
Figure 9:
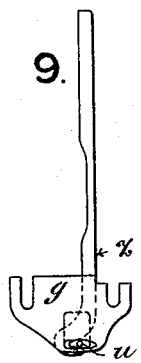
Figure 12:
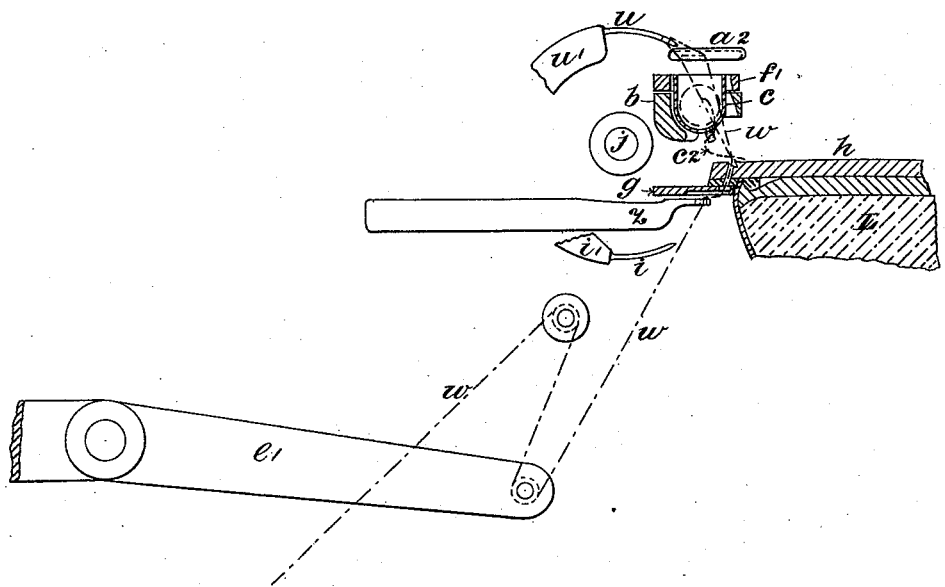
Figure 13:
Figure 14:
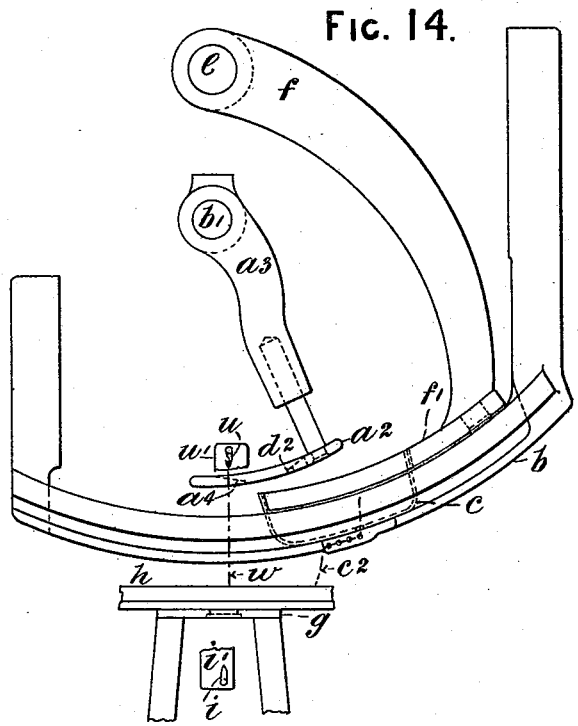
Figure 15:
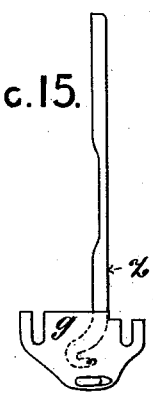
Figure 16:
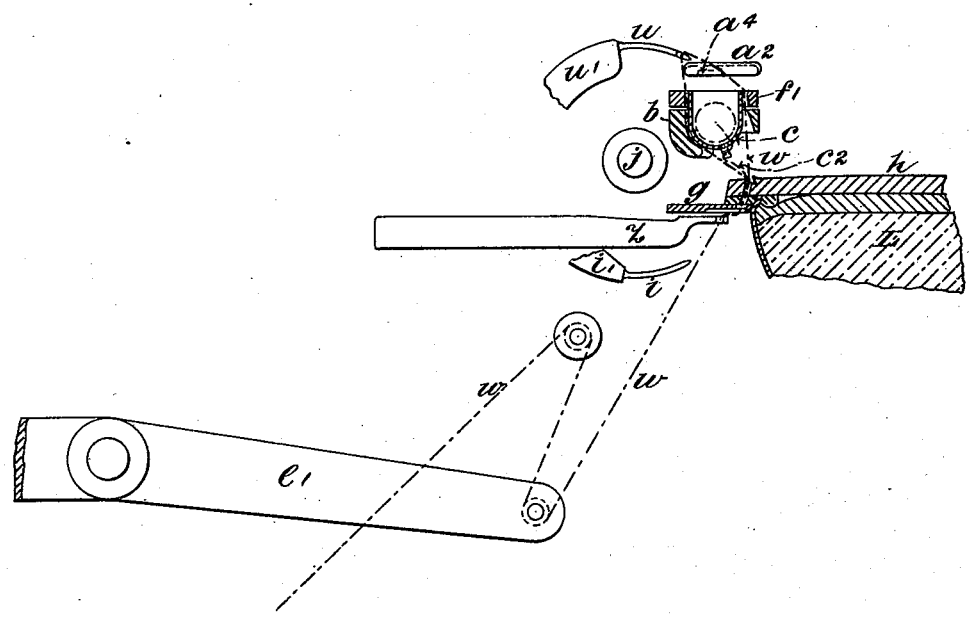
Figure 20:
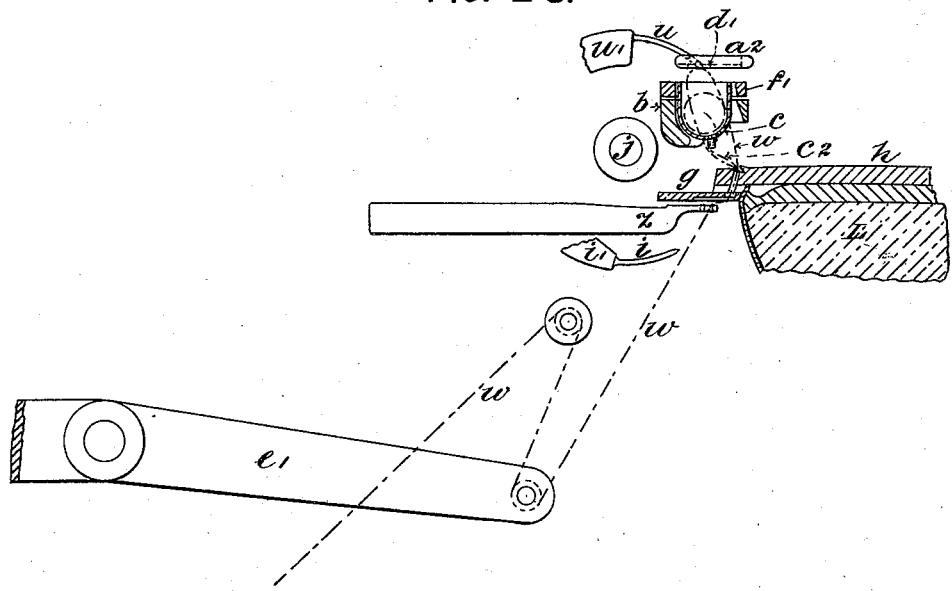

Figs. 10 and 11 are views of the shuttle $c$ with the spool therein.

Figs. 12, 13, 14, and 15 show the same parts as those in Figs. 6 to 9, with the needle in its backward position, having drawn the looper-thread through the material, and the dividing and stripping plate $a^2$ advanced by the cam E, lever $c'$, shaft $b'$, and arm $a^3$, and by the action of its triangular sides $a^4$ opened the two sides of the loop $w$ ready for the shuttle to pass through it, the stitch-tightening lever $e'$ in the meantime having been moved to its highest position by the action of the cam K, and thus given out sufficient thread to allow of the drawing of the loop through the material and the opening thereof for the shuttle to pass through it. Figs. 16, 17, 18, and 19 also show the same parts as above referred to and with the shuttle advanced within the loop, the needle being stationary in the meantime. Figs. 20, 21, 22, and 23 are also a repetition of parts previously shown. The shuttle has now passed completely through the loop and laid the thread from its spool within the said loop. The dividing and stripping plate $a^2$ has now moved in the opposite direction and presented its stripping-bar $d'$ in such position that on the needle making a slight advance or dip the said bar $d'$ strips the loop from the hook of the needle. The two threads being now linked together, the completion of the stitch is effected by the action of the cam K moving the lever $e'$ to its lowest position, thus drawing the said threads tightly together within the material $h$, their positions therein being determined by the amount of tension applied by the shuttle to the thread of the spool, as shown to an enlarged scale in Fig. 24, thus completing the stitch, after which subsequent piercing, feeding, and stitching may be proceeded with.

It will be noticed from the drawings that the needle and piercer work in a curved path and that the circularly-moving shuttle has its race located within the circular path traversed by the needle and piercer and above the work-support, and that the shuttle-thread is delivered therefrom at its under side, so that the operator can at all times see the stitching being done. It will also be noticed that the stripping-plate is moved in a curved path above the shuttle and its driver and between the needle and the driver $f'$. The stripper $a^2$ has a round shank inserted in the arm $a^3$, and said shank is held in place by means of an adjusting or set screw $a^{30}$, (shown in Fig. 2,) said screw permitting the adjustment of the stripper either vertically or axially.

What we claim is—

1. A sewing-machine containing the following instrumentalities, viz: a work-support, a curved hooked needle located above the said work-support, a looper 2, having a sliding and oscillating movement to place the thread into the hook of the needle, a curved piercer, and a curvilinear shuttle-race, and a circularly-moving shuttle, the said shuttle-race being located within the path of movement of the curved needle and piercer and at right angles to the plane of movement of the said needle and piercer and above the work-support, to operate substantially as described.

2. A work-support, a curved piercer, a curved needle, a looper to supply it with thread, a curvilinear shuttle-race located at right angles to the plane of movement of the said needle and piercer and open at its under side for the passage of the shuttle-thread from the shuttle, and a circularly-moving shuttle, combined with a plate open at the side adjacent to and to permit the passage of the needle, whereby a needle with a small curve and short radius may be used and having a point, as $a^4$, and a stripping-bar $d'$, having a straight stripping side, whereby the point of the stripping-plate is enabled to take the loop of needle-thread and open the same for the passage of the shuttle through it, the stripper-bar thereafter stripping the loop from the hook of the needle, substantially as described.

3. The combination, with a hooked needle and co-operating stitch-forming devices and the arm $a^3$ and means to operate it, of the combined spreader and stripper having a round shank inserted in and adjustably connected with the said arm $a^3$, whereby the stripper-plate may be adjusted vertically and axially, to operate substantially as described.

4. A curved hooked needle, means to actuate it, a pivoted fulcrum-block $y^4$, having an extension provided with a pin or projection and having a guideway, and a slide-bar $x$, fitted in said guideway and provided at one end with a looper and at its other end with a pin or projection, combined with a cam-disk having two cam-surfaces to act on the said pins or projections and vibrate the block and reciprocate the looper-carrying bar longitudinally therein, to operate substantially as described.

JOHN WILLIAM RAMSDEN.
HARRY SENIOR ELLIS.

In presence of—
THOS. E. CRAVEN,
*Fel. Inst. P. A.*, 24 *Victoria Chambers, Leeds.*
WILLIAM SADLER,
*Leeds.*